INVENTOR.
FREDERICK D. JOESTING
BY Joseph E. Ryan
ATTORNEY

United States Patent Office 3,170,628
Patented Feb. 23, 1965

3,170,628
THERMOSTAT
Frederick D. Joesting, Park Ridge, Ill., assignor to Honeywell Inc., a corporation of Delaware
Filed Oct. 11, 1962, Ser. No. 229,856
3 Claims. (Cl. 236—1)

My invention relates to thermostatic control devices and more particularly to an improved theromstat designed for use with a fluid amplifier to provide a self-contained control system.

Figure 2:
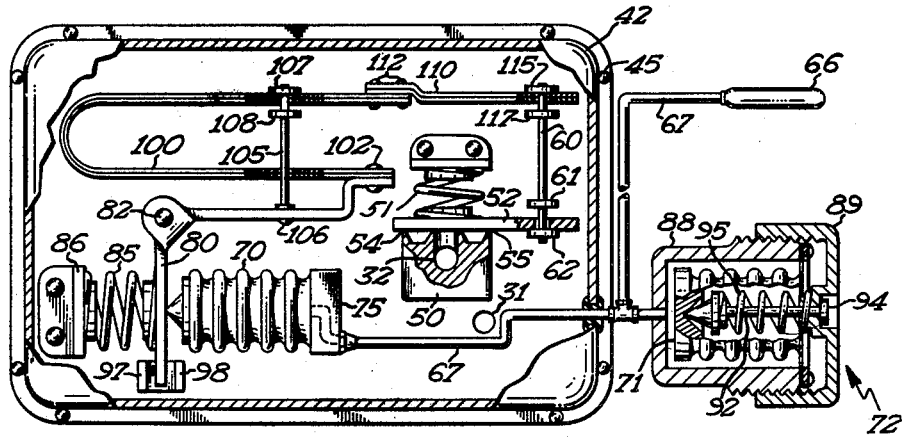
Figure 3:
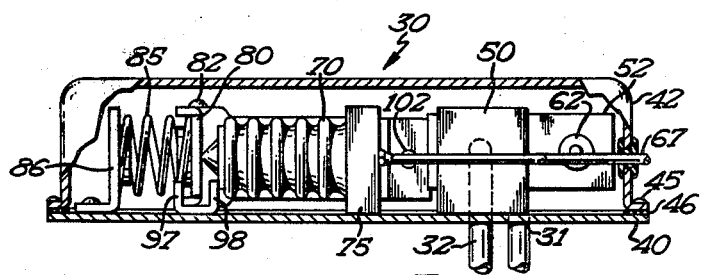
Figure 1:
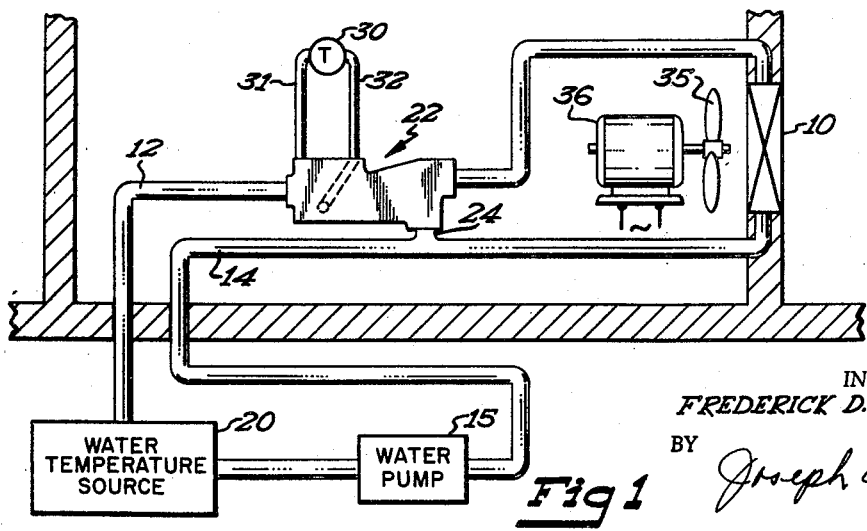

Thermostatic control devices which control fluid flow or pressure output are well recognized. Generally, thermostatic devices of this type control only pressure of the fluid and the fluid is generally air so that it may be vented to atmosphere. Non-bleed thermostats are also recognized, but these require special relay mechanisms or valving. When the fluid being valved is water, it becomes necessary to seal the component parts and in connection with self-contained systems where the fluid medium is also the method for changing a condition such as heating or cooling, the temperature of the control fluid acts on the component parts to alter the effect of the thermostat. The present invention is directed to an improved thermostat design of the self-contained or non-bleed type utilizing a simple bleed type valve and with provisions for summer-winter changeover and compensation for the effects of the temperature of the valved fluid on the component parts of the thermostat. Therefore, it is an object of this invention to provide an improved thermostatic control device of the self-contained type. Another object of this invention is to provide an improved thermostat control with a simple bleed type valve suitable for summer-winter changeover control. Another object of this invention is to provide in a thermostat of this type ambient temperature compensation for the effect of the control fluid in the thermostat parts. These and other objects of this invention will become apparent from a reading of the attached description together with the drawings, wherein:

FIGURE 1 is a schematic diagram of an application of the thermostat,
FIGURE 2 is a top view of the thermostat, and
FIGURE 3 is a side view of the thermostat.

My improved thermostatic control device is shown schematically in FIGURES 2 and 3 and is included in a diagrammatic disclosure of a temperature control apparatus in FIGURE 1 which utilizes a fluid type amplifier for purposes of explaining the application of the same. My prior copending application, entitled "Fluid Amplifier Control System," Serial No. 157,760, filed December 7, 1961, discloses such a fluid amplifier with which this thermostatic control device is normally associated.

In FIGURE 1 there is shown a schematic disclosure of an air conditioning type system in which temperature water or fluid is circulated through a heat exchanger, such as indicated at 10, through a piping 12 and 14 which includes a circulating pump 15. The pump 15 is shown in block, as is the source of the temperate fluid or water 20, to provide a closed system which includes a fluid amplifier, also shown in block and indicated at 22. The amplifier operates as a switching device to direct the temperate fluid through the heat exchanger from the source or to bypass the heat exchanger through a conduit indicated at 24 for controlling purposes. Associated with the fluid amplifier is the thermostat, indicated in block at 30, having a supply conduit 31 and an outlet conduit 32 connected thereto. The thermostat is disclosed in detail at FIGURES 2 and 3 and operates to valve the temperate fluid supplied thereto through the inlet passage 31, providing a fluid flow output through the conduit 32 to the fluid amplifier for control of the same. Depending upon the operation of the thermostat, the amplifier will switch from the direct flow passage through the amplifier to the heat exchanger to one which connects the bypass conductor 24 thereto, closing off the passage to the heat exchanger and effecting a bypass of the same. Thus, the fluid temperate medium may be supplied to or bypass the heat exchanger and as such the control of fluid or the temperature changing medium therethrough will be controlled for affecting a change in temperature in the space in which the heat exchanger is positioned. As shown in FIGURE 1, the heat exchanger has associated therewith an air circulation means or fan 35 driven by a motor 36 for the purpose of circulating air across the heat exchanger in the ventilation and air conditioning of the room or space with which the apparatus is associated.

Considering FIGURES 2 and 3, it will be seen that the thermostat 30 includes a two-part housing, one part being a base member 40 and the other a cover member 42, which are connected together through suitable means such as screws 45 with a sealing gasket 46 therebetween to provide a watertight housing for the thermostat. As indicated in FIGURE 2, the inlet and outlet passages 31 and 32 to the thermostat lead through the base part 40 with the outlet passage 32 terminating in a bleed type nozzle indicated at 50. Nozzle 50 has associated therewith a spring 51 and a flapper 52 which, with the nozzle, provides a simple bleed type valve means controlling flow of the fluid within the housing 30 out through the outlet passage 32. The flapper 52 is lapped and is adapted to rock on opposite edge surfaces of the nozzle such as is indicated at 54, 55, which edge surfaces are aligned with the surface of the nozzle and are relatively knife-edged to provide a pair of pivot surfaces for opposite operation of the valve means. As will be later noted, this will provide an arrangement for reverse or direct action of the valve in accordance with opposite directions of input movement. Thus, as seen in FIGURE 2, movement of the flapper in such a manner as to rock on the surface 55 willl open the valve, while movement in the opposite direction, causing pivoting of the flapper on the surface 54, will also open the valve and the direction of flapper movement, in each instance, will be opposite to that causing opening of the valve with respect to the opposite pivot. The valve means defined by the flapper 52 and nozzle 50 is operated by an operating shaft or means 60 having a pair of flanges 61, 62 at one extremity thereof, which flanges are positioned on opposite surfaces of the flapper, the shaft extending through a portion of the flapper for alignment and retention purposes.

The input movement to the shaft 60, that is the means for operating the operating shaft or operating means 60 of the valve, is a closed thermal system. This closed thermal system includes a sensing bulb 66 connected by means of piping 67 to an expansion member or bellows 70 and an expansion means 71 of a setting device 72. This thermal system is so disposed that the expansion element is located within the thermostat and the sensing bulb and setting device 72 are positioned external of the casing 30 of the thermostat and connected through the piping 67 thereto. This closed thermal system is of the liquid fill type and the bulb is remote from the thermostat so that it can be placed within the location or space in which the desired temperature is to be sensed and controlled. Similarly, the setting device may be located adjacent the sensing bulb or remote therefrom in the space for convenience. The thermostat will normally be located at or near the location for the fluid amplifier. The conduit 67 extending into the casing of the thermostat 30 will be sealed therein to maintain the watertight seal for the thermostat housing with only the passages 31, 32 therein.

Expansion element 70 is secured to the base of the thermostat through suitable means, such as is shown schematically at 75, to the base 40 of the housing. This expansion element extends parallel with the base and is adapted to provide movement in accordance with the condition sensed in a direction parallel to the base 40 of the thermostat housing. This expansion element cooperates with a pivoted lever 80 which is pivoted on the base as at 82, the lever being L-shaped in form and having one surface thereof positioned adjacent the end of the expansion member or bellows 70 to be engaged thereby. Positioned on the opposite side of the bellows and extending parallel to the base 40 of the housing is a return spring or bias spring 85 which is also secured to the base through a suitable bracket means such as is indicated schematically at 86. Thus, expansion of the bellows will operate to move the lever 80 against the bias of the spring 85 to position the same and operate the operating shaft 60 in a manner to be later described.

The remaining portion of the thermal system, that is the setting device 72, is basically a second expansion chamber housed in a casing 88 having an adjustable or threaded cover 89 thereon, the chamber being defined by a bellows or expansion means 71 positioned within the housing to provide a variable chamber in communication with the closed thermal system comprising the expansion member 70 and the sensing bulb 66 through connection of the piping conduit 67. This setting device includes a thrust pin 92 bearing against the end of the bellows at one extremity and having a flange 94 at the opposite extremity resting against the surface of the cover 89 of the setting device in such a manner that the thrust pin 92 is free to move within the cover 89. A setting spring 95 bears against the cover and the pin to apply a bias to the bellows setting the volume of the setting chamber defined by the bellows 71 and casing 88. This will, for a fixed temperature condition, cause expansion of the member 70 as the cover 89 is threaded onto the threaded part of the casing 88 to decrease the volume of the setting chamber, forcing the fluid into the setting device to provide a new set point for the operation of the thermostat. Adjusting the threaded cover 89 in the opposite direction will increase the volume of the device and allow for decrease in the size of the expansion element 70, shifting the pivoted lever of the thermostat to provide for an increased temperature setting. Whenever the closed thermal system expands beyond the limit of expansion of the expansion element 70, as will be later defined, the setting chamber is allowed to collapse its bellows and force the thrust pin 92 out of the cover against the force of the spring 95 for takeup of any change in the closed thermal system by high extremes in temperatures sensed by the sensing bulb 66 of the system. The movement of the expansion element 70 is limited by a pair of stops 97, 98 positioned on the base 40 of the thermostat housing 30, which stops have the end of the pivoted lever positioned therebetween defining limits of movement of the lever and hence limits of movement of the expansion element 70 of the closed thermal system.

As previously indicated, the lever 80 is shown in FIGURE 1 as generally L-shaped or crank-shaped in form and has mounted at its extremity, remote from the expansion element and opposite the pivot, a temperature sensing means or U-shaped bimetal 100 which is secured to the end of the lever through suitable means, such as rivets 102. This U-shaped bimetal or sensing element 100 extends parallel to the base 40 of the thermostat and is so mounted on the end of the lever as to be pivoted therewith to provide a connection linkage between the lever and the operating shaft 60, as will be later defined. This temperature sensing means is exposed to the fluid being valved within the thermostat housing and is designed to warp between predetermined limits to provide for summer-winter changeover or reversal of operation of the valve means with the given expansion of the expansion element 70 of the closed thermal system. Movement of the bimetal is limited by means of a pin 105 secured at one extremity to the lever, as at 106, and extending in part through apertures in the bimetal with a pair of flange means 107, 108 at the opposite extremity thereof. These flanges 107, 108 are positioned on opposite sides of the free end of the bimetal and operate as stop means to limit the warpage of the bimetal with change in temperature of the fluid medium within the thermostat housing. Since the end 106 of the pin 105 is fixed to the lever 80, the bimetal may warp between the extremes of movement defined by the stops 108, 107 on the pin 105 so that the free end of the same will be limited to predetermined movement while the entire assembly will move with the lever through movement of the expansion member or bellows 70.

The free end of the bimetal 100 beyond the stops 107, 708 mounts a second bimetal element or temperature responsive means 110 which is secured to the extremity of the bimetal 100 through suitable means, such as rivets indicated at 112. This bimetal 110 has its active surface reversed from the position of the active surface on the bimetal 100 such that it warps in the direction opposite that of the movement of the bimetal 100 for the same temperature change of the fluid medium surrounding the same. It will be evident that the bimetals 110 and 100 are both exposed to the fluid being valved within the housing of the thermostat 30 and the bimetal 110 is included for compensation of the effect of the temperature of the fluid medium being valved on the expansion member 70 and its fluid therein. Since the thermal system is designed to respond only to the temperature of the space to be air conditioned or controlled by the thermostat 30, its sensing portion must be compensated for the effect of the temperature of the fluid medium being valved since this system is of the self-contained type and the medium being valved is also the tempered fluid applied to the heat exchanger for temperature changing purposes. Thus, when hot water is the medium supplied to the heat exchanger, it will also be applied to the thermostat and will be exposed to the main summer-winter switchover bimetal setting the thermostat for winter operation through warpage of the bimetal 100. The hot water, however, will cause unwanted expansion of the element 70, changing the setting of the thermostat. The additional bimetal 110 will compensate for this ambient temperature change within the thermostat and will compensate for variation in the change in temperature of the fluid medium being valved such that the setting device 72 may always remain in accurate calibration. Its warpage will offset the change in the position of the expansion element 70 and hence provide for a desired linkage position from the lever to the operating shaft 60 so that the valve defined by the flapper 52 and nozzle 50 will be operated solely by the thermal system.

The free end of the bimetal 110 has an aperture therein through which the free extremity or the opposite extremity of shaft 60 extends. This end of the shaft 60 carries a second pair of flanges 115, 117 which are positioned on opposite surfaces of the bimetal 110. These flanges are adapted to be selectively engaged by the bimetal 110 whenever the summer-winter changeover thermal element 100 experiences a change in fluid temperature within the casing of the thermostat 30, causing warpage of the bimetals 100, 110 and movement of the free end of the bimetal 110 to a position defined or limited in movement by the stops 107, 108. Thus, for warm water within the thermostat, the bimetal will rest against the stop 108 and the free end of the bimetal 110 will be displaced, even though its direction of warpage is in the direction opposite from that of the bimetal 100, to rest against the flange 117, urging the shaft 60 down so that the end of the flapper 52 will be engaged by the flange 61. Movement of the thermal system, that is the expansion element 70, with change in ambient temperature surrounding the bulb 66, will cause the pivoted lever to rock on the edge 55 of the nozzle and downward movement of the shaft 60 with clockwise movement of the lever system or expansion of the element 70 will rock the pivoted lever to open the valve. Since the thermostat is a simple bleed device, it is necessary to have the bellows 70 be able to open and close the valve in the summer and in the winter, in opposite directions. In either season it must be impossible to cause the wrong valve action, because the system would lock out. For example, in winter the bimetal is down operating against flange 117 and 61 to open the pilot valve when bellows 70 expands. Opening the pilot valve causes flow through the bypass, meaning the room is warm. Now supposing the room cools off, and the lever 80 moves counterclockwise, permitting the flapper valve to close. If further movement is permitted the valve can be opened by engaging flanges 115 and 62 to raise the flapper. This will open the pilot valve and put the flow in the bypass, even though the room is too cool, which will lock it out so it can no longer control. To prevent this, stops 97 and 98 limit the travel of the lever, and the spacing between stops 107 and 108, and the travel required to engage flanges 115 and 62 or to engage 117 and 61 are so arranged that the flapper cannot be lifted in the winter operation, and cannot be depressed in the summer operation. This prevents the possibility of any condition arising which would cause the lockout, such as overshooting or undershooting of room temperature, or making a change in control point.

The spring pressing against flapper 52 holds it closed. When flange 61 presses down against the flapper, the valve is open, and when lever 80 moves so that flange 61 is disengaged, the shaft 60 floats loosely with none of the flanges touching, and the flapper is held against the nozzle by means of the spring. Therefore, the valve will merely open or close for the limited movement of the shaft as the operating means or shaft 60 is moved down or up, as seen in the drawing in FIGURE 2. For the opposite condition of air conditioning, that is with cold water being valved by the fluid amplifier to the heat exchanger, the temperature of the fluid being valved within the housing will affect the bimetals 110, 100 so that the stop 107 will be engaged and the free end of the bimetal 110 will rest against the flange 115, causing the operating shaft 60 to be moved through this connection and providing for engagement of the pivoted flapper 52 with the stop 62 on the operating shaft and rocking engagement of the flapper 52 on the edge 54 of the nozzle.

Thus, under heating conditions, the changes in ambient temperature around the bulb 66 in a direction indicated by an increase in temperature in the space will cause expansion of the thermal element and clockwise pivoting of the lever 80 to move the shaft 60 in a direction to open the valve defined by the flapper 52 and nozzle 50. On a reversal in temperature (cooling at bulb 66), lever 80 will move counterclockwise and permit spring 85 and spring 51 above the flapper 52 to close the nozzle 50.

A reversal in operation of the valve for the same movement of the expansion member whenever the bimetal has changed its position between the stops 107 and 108 will be obtained through movement of the expansion member and operation of the operating shaft 60 on the valve. This happens because the opposite flange 61 or 62 will be engaged, causing rocking of the flapper 52 on the nozzle 50 on edge surfaces 54 or 55. The compensating element 110 included in the thermostat and connected to the summer-winter changeover bimetal 100 will merely offset the change in temperature on the expansion element 70 and will compensate basically for variations in the water temperature. Thus, bimetal 110 compensates for the effect of the water temperature on bellows 70 and bimetal 100 makes the change necessary for summer-winter changeover. During summer-winter changeover, bellows 70 is affected by the change in water temperature and bimetal 110 offsets that, just the same as after a changeover has occurred and the water temperature varies, such as in compensated systems, bimetal 110 still has an equal and opposite effect to bellows 70.

The setting device 72 of the thermal system merely varies the expansion of the expansion element 70 to provide for given set point of the thermal system so that the thermal system may operate the valve about a predetermined set point, causing pivoting of the valve or opening or closing of the bleed valve above and below the desired setting.

Fluid input into the thermostat housing is obtained from the passage 31 leading directly to the supply of the fluid amplifier so that the air conditioning medium within the housing may be controlled through the flow passage out of the thermostat or passage 32 in accordance with valve operation for the position of the flapper nozzle combination 50, 52.

This thermostat design provides for a simple, self-contained control apparatus utilizing a simple bleed nozzle with an arrangement for summer-winter changeover and compensation for the ambient temperature changes of the medium being valved on the parts of the thermostat. In considering this invention it should be remembered that the present disclosure is illustrative only and the scope of the invention should be determined only by the appended claims.

I claim as my invention:

1. In a thermostat for use with a fluid amplifier, a fluid-tight housing, inlet and outlet passages in said housing adapted to be connected to a source of fluid medium for a fluid amplifier and in controlling relationship to an amplifier, nozzle means connected to the outlet passage in said housing and having a pivoted flapper associated therewith, a movable shaft having two pairs of flange means thereon, one pair being adapted to selectively engage said flapper and tilt said flapper on said nozzle in opposite directions of shaft movement depending upon which of said flange means of said pair is engaged, a closed thermal system including a sensing bulb, expansion element and a collapsible setting means, said expansion element being positioned in said fluid-tight housing and said sensing bulb being adapted to be positioned in the space to be controlled by a fluid amplifier, a pivoted lever in said housing being engaged by said expansible element to be moved thereby, bimetal means connected to one extremity of said pivoted lever remote from said expansion element, second bimetal means connected to the free extremity of said first named bimetal means and reversed as to direction of activation therefrom, the free extremity of said second bimetal means engaging the second pair of said flange means on said movable shaft for operating said shaft, said second bimetal means compensating for the ambient temperature effect of the fluid within said housing on the expansible element, said first named bimetal means reversing the operation of said flapper nozzle for given changes in temperature sensed by said sensing bulb in accordance with the temperature of the fluid being valved by said thermostat and controlling a fluid amplifier.

2. In a thermostat for use with a fluid amplifier, a fluid-tight housing, inlet and outlet passages in said housing adapted to be connected to a source of fluid medium for a fluid amplifier and in controlling relationship to an amplifier, nozzle means connected to the outlet passage in said housing and having a pivoted flapper associated therewith, a movable shaft having two pairs of flange means thereon, one pair being adapted to selectively engage said flapper and tilt said flapper on said nozzle in opposite directions of shaft movement depending upon which of said flange means of said pair is engaged, a closed thermal system including a sensing bulb and an expansion element, said expansion element being positioned in said fluid-tight housing and said sensing bulb being adapted to be positioned in the space to be controlled by a fluid amplifier, a pivoted lever in said housing being engaged by said expansible element to be moved thereby, bimetal means connected to one extremity of said pivoted lever remote from said expansion element, second bimetal means connected to the free extremity of said first named bimetal means and reversed as to direction of activation therefrom, the free extremity of said second bimetal means engaging the second pair of said flange means on said movable shaft for operating said shaft, said bimetal being adapted to be affected by the temperature of the fluid being valved by said flapper nozzle to control movement of said shaft through engagement of one or the other of said flanges to cause said flapper to rock selectively on opposite surfaces of said nozzle to reverse the direction of operation of the valve means for given movement of said expansion element.

3. In a thermostat for use with a fluid amplifier and operating on fluid for controlling an amplifier, a casing including a fluid-tight housing, an inlet supply port adapted to be connected to an amplifier and receiving an operating fluid therefrom, an outlet passage in said casing adapted to return said fluid under pressure to an amplifier as controlled by the thermostat, nozzle means included in said casing having a pair of parts at least one of which is tiltable on fixed fulcrum means, said tiltable part being tiltable in opposite directions on said fixed fulcrum means to reverse the control function of said nozzle means, one of said parts of said nozzle means being connected to the outlet passage such that the nozzle means controls pressure from said inlet to a fluid amplifier, operating means including a lost motion connection for said nozzle means mounted in said casing and cooperating with said tiltable part of said nozzle means to control the operation of the same, a closed thermal system including remotely positioned sensing means and an expansion element within said casing, motion transmission means associated with said expansion element in said casing and adapted to transmit movement of said expansion element representing the variation in conditions sensed by said sensing means, and temperature sensing means associated with said motion transmitting means and connecting the motion transmitting means to said operating means for said nozzle means, said temperature sensing means responding to temperature of the fluid within said casing and operative to reverse the operation of said tiltable port for a given direction of movement of said expansion element upon a change in the condition sensed by said sensing means for different temperatures of the fluid being valved.

References Cited by the Examiner
UNITED STATES PATENTS

| | | | |
|---|---|---|---|
| 2,101,735 | 12/37 | Fonseca | 236—15 |
| 2,463,599 | 3/49 | Branson. | |
| 2,463,600 | 3/49 | Carson. | |
| 2,558,937 | 7/51 | Dillman | 236—1 |

EDWARD J. MICHAEL, *Primary Examiner.*